(12) United States Patent
Yonetani et al.

(10) Patent No.: US 6,965,304 B2
(45) Date of Patent: Nov. 15, 2005

(54) TIRE INFORMATION OBTAINING DEVICE, METHOD FOR OBTAINING TIRE INFORMATION AND TIRE INFORMATION OBTAINING PROGRAM

(75) Inventors: Masahiro Yonetani, Toyota (JP); Hideki Ohashi, Chiryu (JP); Minao Yanase, Kobe (JP); Yukio Nakao, Kobe (JP)

(73) Assignees: Toyota Jidosha Kabushiki Kaisha, Toyota (JP); Sumitomo Rubber Industries, Ltd., Kobe (JP)

( * ) Notice: Subject to any disclaimer, the term of this patent is extended or adjusted under 35 U.S.C. 154(b) by 23 days.

(21) Appl. No.: 10/468,733

(22) PCT Filed: Feb. 26, 2002

(86) PCT No.: PCT/IB02/00576

§ 371 (c)(1),
(2), (4) Date: Nov. 5, 2003

(87) PCT Pub. No.: WO02/068225

PCT Pub. Date: Sep. 6, 2002

(65) Prior Publication Data

US 2004/0075545 A1    Apr. 22, 2004

(30) Foreign Application Priority Data

Feb. 26, 2001 (JP) .............................. 2001-050949

(51) Int. Cl.$^7$ ............................................ B60C 23/00
(52) U.S. Cl. ...................... 340/444; 340/454; 340/438; 340/425.5; 73/146.2; 301/9.1
(58) Field of Search ............................ 340/444, 425.5, 340/440, 442, 438, 454, 443; 73/146, 146.2, 73/146.3; 301/9.1, 10.1, 11.1, 18

(56) References Cited

U.S. PATENT DOCUMENTS

| 4,880,072 A | * | 11/1989 | Sakamoto et al. .......... 180/415 |
| 5,531,110 A | * | 7/1996 | Ohashi et al. ................ 73/146 |
| 5,712,616 A | * | 1/1998 | Schmitt et al. ............. 340/442 |
| 5,801,305 A | * | 9/1998 | Kawai et al. .............. 73/146.2 |
| 5,844,475 A | | 12/1998 | Horie |
| 5,864,056 A | * | 1/1999 | Bell et al. ...................... 73/146 |
| 5,936,519 A | | 8/1999 | Nakajima et al. |
| 5,939,626 A | * | 8/1999 | Tominaga et al. ......... 73/146.2 |
| 6,092,028 A | | 7/2000 | Naito et al. |
| 6,264,292 B1 | | 7/2001 | Umeno et al. |
| 6,324,461 B1 | | 11/2001 | Yamaguchi et al. |
| 6,385,553 B1 | | 5/2002 | Naito et al. |
| 6,504,475 B2 | | 1/2003 | Sugisawa |
| 6,584,427 B2 | | 6/2003 | Kamiya et al. |

(Continued)

FOREIGN PATENT DOCUMENTS

EP          0636503 B1      2/1995

(Continued)

*Primary Examiner*—Jeffery Hofsass
*Assistant Examiner*—Daniel Previl
(74) *Attorney, Agent, or Firm*—Oliff & Berridge, PLC

(57) ABSTRACT

A vehicle wheel speed is calculated based on a vehicle wheel speed signal outputted from a vehicle wheel speed sensor and a change width w which is an amplitude of a time change component of the calculated vehicle wheel speed. When the calculated change width w is equal to or more than a reference value $w_0$ it is judged that a quick tire deformation is currently generated and a driver of the vehicle is informed of the quick deformation by actuating a warning device.

14 Claims, 9 Drawing Sheets

U.S. PATENT DOCUMENTS

| | | |
|---|---|---|
| 6,640,623 B2 | 11/2003 | Ono et al. |
| 6,668,637 B2 | 12/2003 | Ono et al. |
| 6,696,934 B2 | 2/2004 | Sugisawa |
| 6,744,355 B2 | 6/2004 | Kogure et al. |
| 2002/0105419 A1 | 8/2002 | Sugisawa |
| 2003/0080863 A1 | 5/2003 | Oshiro et al. |
| 2003/0192375 A1 | 10/2003 | Sugai et al. |
| 2004/0046650 A1 | 3/2004 | Yanase |

FOREIGN PATENT DOCUMENTS

| | | | |
|---|---|---|---|
| JP | 05-229320 | * | 7/1993 |
| JP | A 5-229320 | | 9/1993 |
| JP | A 5-319041 | | 12/1993 |
| JP | A 7-149123 | | 6/1995 |
| JP | A 10-230717 | | 9/1998 |
| JP | A 2000-238516 | | 9/2000 |

* cited by examiner

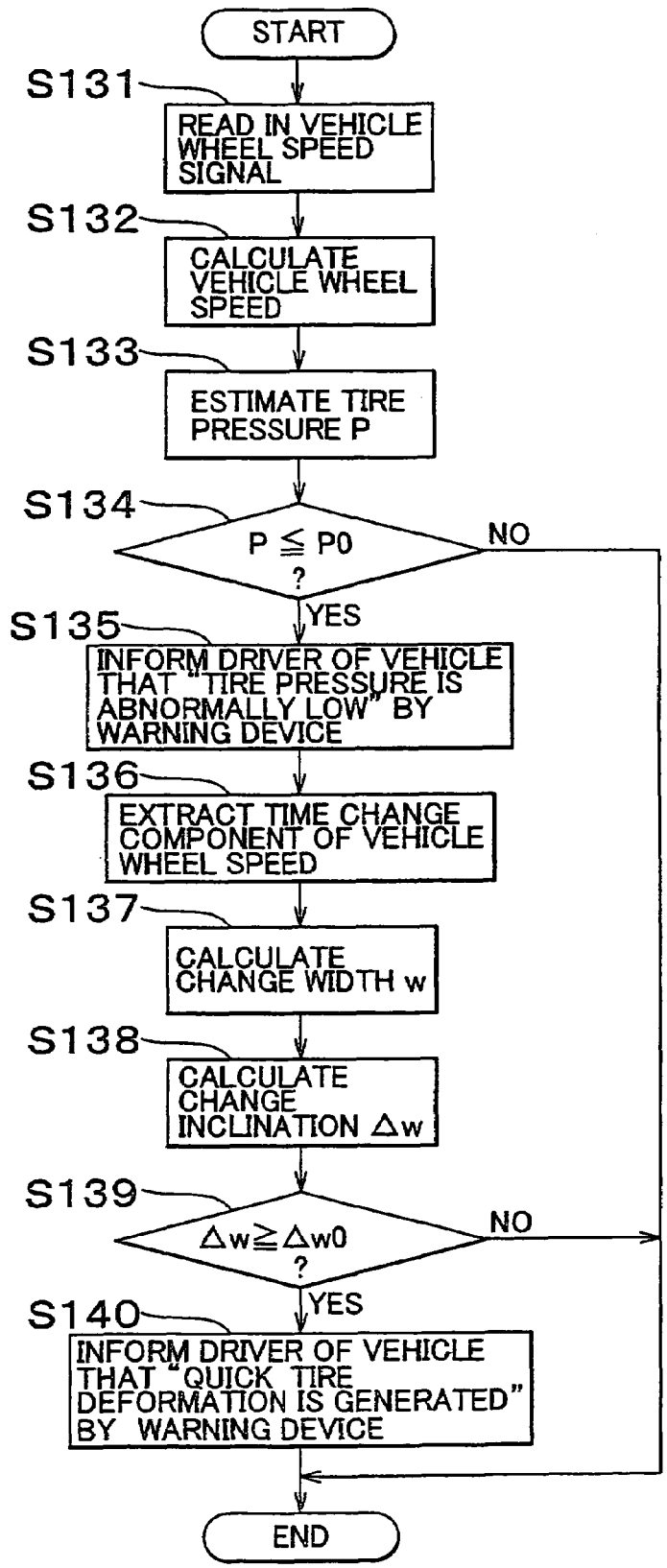

TIRE INFORMATION OBTAINING DEVICE, METHOD FOR OBTAINING TIRE INFORMATION AND TIRE INFORMATION OBTAINING PROGRAM

BACKGROUND OF THE INVENTION

1. Field of the Invention

This invention generally relates to a technology for obtaining a tire information relating to a vehicle tire under a vehicle being running condition, and more particularly to a technology for obtaining an estimated tire information based on a vehicle wheel speed signal indicating a vehicle wheel speed which is represented by an angular rotational speed of a vehicle wheel installed with a tire.

2. Description of the Related Art

The tire information of a vehicle tire is important for an operator of a vehicle and a vehicle control device which controls the vehicle.

In a Japanese Patent Application Publication No. 2000-238516, a technology which relates to an obtaining the tire information by estimation based on a vehicle wheel speed signal indicating a vehicle wheel speed represented as an angular speed of a wheel installed with a tire. According to this disclosed technology, a tire pressure is estimated as a tire information based on the vehicle wheel speed signal and when the estimated tire pressure is below a normal value, the operator of the vehicle is informed that the tire pressure is abnormally low.

Further, the tire information important to the operator of the vehicle or the vehicle control device is obtained by other than the tire pressure. Such tire information includes a tire deformation related information which indicates whether a quick deformation is currently being generated or not, or whether such deformation may be possibly generated in near future or not.

However, a technology that can obtain the tire deformation information during the vehicle running has not been realized before.

SUMMARY OF THE INVENTION

It is an object of the present invention to provide a device and method for obtaining a tire deformation related information which indicates whether a quick deformation is currently being generated or not, or whether such deformation may be possibly generated in near future or not, on the basis of other than the tire pressure during the vehicle being running as a tire information important to a driver of the vehicle or a vehicle control device. The technical features and the combination thereof described in the specification shall not be interpreted to be limited to each embodiment of the invention explained hereinafter.

The tire information obtaining device according to a first aspect of the invention comprises a vehicle wheel speed sensor detecting a wheel speed represented by an angular speed of the vehicle wheel and outputting a vehicle wheel speed signal in response to the vehicle wheel speed and an estimating device for estimating a tire deformation related information which indicates whether a quick tire deformation is currently being generated or not, or whether such deformation may be possibly generated in near future or not based on the outputted vehicle wheel speed signal.

According to this first aspect, based on the vehicle wheel speed sensor, the tire deformation related information is estimated whether a quick tire deformation is currently being generated or not, or whether such deformation may be possibly generated in near future or not. Thus estimated tire deformation related information can be, for example, indicated to a driver of the vehicle during the vehicle running. Accordingly, the driver of the vehicle can operate the vehicle considering the tire deformation condition.

Further, the estimated tire deformation related information can be used by the vehicle control device for controlling the vehicle and accordingly, the vehicle control device can control the vehicle considering the tire deformation condition.

The "quick deformation" may mean for example a deformation which is not physically restorable or difficult to be restored or it may mean a deformation which is irreversible.

Further, the estimating device can be constructed to judge whether a quick tire deformation is currently being generated or not, or whether such deformation may be possibly generated in near future or not based on a time change component of the vehicle wheel speed corresponding to the outputted vehicle wheel speed signal. When a possibility of the quick tire deformation being currently generated, or such deformation being possibly generated in near future is occurred, the time change component of the vehicle wheel speed based on the wheel speed signal, for example, the time change width or the inclination thereof be influenced by the possibility of generation of such quick deformation.

Considering the above, according to one aspect of the present invention, it is judged whether a quick tire deformation is currently being generated or not, or whether such deformation may be possibly generated in near future or not based on the time change component of the vehicle wheel speed.

As the time change component of the vehicle wheel speed, at least one of the predetermined conditions including the time change width of the wheel speed and the inclination thereof is established, it can be judged such possibility of quick deformation being currently generated or such deformation being generated in near future.

If the predetermined condition relating to the change width of the time change width component of the vehicle wheel speed and the predetermined condition relating the time change inclination are both established, it may be judged that the possibility of quick deformation is being currently generated or such deformation being generated in near future. This will improve the judgment accuracy compared to the case that the possibility of quick deformation being currently generated or such deformation being generated in near future is judged based on either one of the predetermined conditions being established.

It may also be judged that the possibility of quick deformation is being currently generated or such deformation being generated in near future, if a condition that the tire pressure state amount which is a state amount of the tire air pressure is estimated based on the vehicle wheel speed signal and the estimated tire pressure condition amount is lower than a normal value and a condition that is predetermined regarding to the time change component of the vehicle wheel speed are both established at the same time.

One of the causes for the quick tire deformation is that the tire pressure as an air pressure of the tire is lower than the normal pressure value.

Accordingly, as mentioned above, if it is judged that the possibility of quick deformation is being currently generated or such deformation being generated in near future when both conditions, one that the tire pressure condition amount which is a state amount of the tire pressure is estimated based on the vehicle wheel speed signal and the estimated tire pressure state amount is lower than a normal value and the other condition that is predetermined regarding to the time change component of the vehicle wheel speed are established at the same time, such judgment is more accurate than the judgment compared to the case that the possibility of quick deformation being currently generated or such deformation being generated in near future is judged based on the establishment of the predetermined condition of the time change of the vehicle wheel speed.

According to the above aspect of the invention, a common wheel sensor is used for estimation of the tire pressure state amount and estimation of tire deformation related information. Thus the number of component can be reduced compared to the case that a plurality of sensors is used for respective estimations.

The term "tire pressure state amount" may mean here the absolute pressure value or the relative pressure value. The absolute value means continuous value or a plurality of dispersion value for the tire pressure amount. The relative value means a difference value from a predetermined value of the tire pressure, or the characteristic whether the tire pressure value is higher or lower, or the characteristic whether the pressure is deviated from the reference value or the permissible range.

Further, the vehicle may include a plurality of wheels and the wheel speed sensors are provided in each wheel. The estimating device may judge whether the quick deformation is being currently generated or the possibility of such deformation being generated in near future respectively and independently from the others in each wheel based on the time change component.

According to the structure of the aspect, it is possible to obtain the tire deformation related information in each wheel without using the time change components of the wheel speed of the other wheels.

Further, the vehicle may include a pair of front wheels and a pair of rear wheels and the wheel speed sensors are provided in each wheel. The estimating device may judge whether the quick deformation is being currently generated or the possibility of such deformation being generated in near future based on the difference of characteristic of the change component of the wheel speed or the ratio thereof among the wheels.

According to the structure of this aspect, it is possible to obtain the tire deformation related information in each wheel without using the time change components of the wheel speed of the other wheels.

Further, the time change component of the wheel speed is changed by the factor other than the tire deformation condition, such as the disturbance, for example, the vehicle speed which is the vehicle speed under the vehicle running. It is, therefore, necessary to provide a signal treatment or data treatment to cancel the influence of the time change component of the vehicle wheel speed influenced by such disturbance so that the time change component in each wheel may exactly reflect the tire deformation condition.

According to this aspect of the invention, however, the judgment of whether the quick deformation is being currently generated or the possibility of such deformation will be generated in near future based on the difference of characteristic of the change component of the vehicle wheel speed or the ratio thereof among the wheels.

According to this aspect of the invention, even if the time change component of the vehicle wheel speed is influenced by such disturbance, as long as such influence level is common to each wheel, the influence by the common disturbance may be substantially canceled relating to the difference of characteristic of the change component of the vehicle wheel speed or the ratio thereof among the wheels.

Thus, it can estimate accurately the tire deformation related information without being influenced by the disturbance according to this aspect of the invention.

It should be noted here that the term "change component characteristic" may be interpreted as the change width of amplitude of the time change component or the time change inclination of the change width.

It is general that the wheel vibration characteristics between front left and front right wheels are common to each other and also general that the wheel vibration characteristics between rear left and rear right wheels are common to each other.

Based on the fact or theory as such, it may be judged whether the quick deformation is being currently generated or the possibility of such deformation will be generated in near future at either one of the front left and right wheels or at either one of the rear left and right wheels based on the difference of characteristic of the change component of the vehicle wheel speed or the ratio thereof between the front left and right wheels or rear left and right wheels.

It may be also judged whether the quick deformation is being currently generated or the possibility of such deformation will be generated in near future at either one of the plurality of wheels based on the difference of characteristic of the change component of the vehicle wheel speed or the ratio thereof between the front left and right wheels and the rear left and right wheels.

According to this aspect of the invention, with respect to the plurality of wheels, the time change component characteristic of the wheel speed is treated so that the common disturbance between the front and rear left wheels is canceled by the common disturbance between the front and rear right wheels. Also, the time change component characteristic of the vehicle wheel speed is treated so that the common disturbance between the front left and right wheels is canceled by the common disturbance between the rear left and right wheels.

Accordingly, the disturbance against the time change component of the wheel speed regarding the plurality of wheels can be canceled to accurately and yet easily obtain the tire deformation related information.

It may be judged whether the quick deformation is being currently generated or the possibility of such deformation will be generated in near future at either one of the front left and right wheels or at either one of the front left and rear right wheels either one of front right and rear left wheels based on the difference of characteristic of the change component of the vehicle wheel speed or the ratio thereof between the front left and rear right wheels or front right and rear left wheels.

According to this aspect of the invention, it may easily obtain the tire deformation related information by canceling the disturbance against the time change component of the wheel speed of the plurality of wheels. However,when using this method, it may influence on the time change component characteristic of the wheel speed or the ratio thereof between the front and rear wheels if the wheel vibration characteristic (for example, depending on the suspension type or the structure) is different between the front and rear wheels.

A method for obtaining the tire information according to the second aspect of the invention detects the vehicle wheel speed as an angular speed of the wheel, receives the wheel speed signal from the vehicle wheel speed sensor outputting the wheel speed signal based on the detected vehicle wheel speed, and estimates the tire deformation related information whether the quick tire deformation is currently being generated or the possibility of such deformation will be generated in near future based on the received wheel speed signal.

According to the second aspect, similar effects can be obtained as those of the previous aspect based on the basic principle.

A tire information obtaining program according to the third aspect of the invention includes a program for executing the method for obtaining the tire information according to the second aspect by a computer.

According to the program of the third aspect, similar effects can be obtained as those of the first aspect based on the basic principle when the program is executed by the computer.

It is possible to design the program to achieve the effects in each aspect which includes similar technical features to the device of the first aspect.

The program includes not only a combination of the directions executed by the computer to achieve the functions but also the files and data to be executed according to each direction.

BRIEF DESCRIPTION OF THE DRAWINGS

FIG. 10 is a flow chart showing a general tire information obtaining program executed by a computer in an estimating device of a tire information obtaining device according to a sixth embodiment of the present invention.

DETAIL DESCRIPTION OF THE PREFERRED EMBODIMENTS

Referring now to the embodiments of the present invention in more detail with reference to the attached drawings, in FIG. 1, the hardware structure of the tire information obtaining device (hereinafter simply mentioned as obtaining device) according to the first embodiment is shown in block diagram. The obtaining device is installed in a vehicle. This device obtains a tire information by estimating the tire deformation related information by executing the tire information obtaining method which is another aspect of the invention.

The vehicle is equipped with front and rear, right and left wheels. The total number of wheel is four. As well known manner, each wheel is structured by a rubber tire installed in a metal wheel and the air under pressure is introduced and sealed in the tire.

Figure 1:
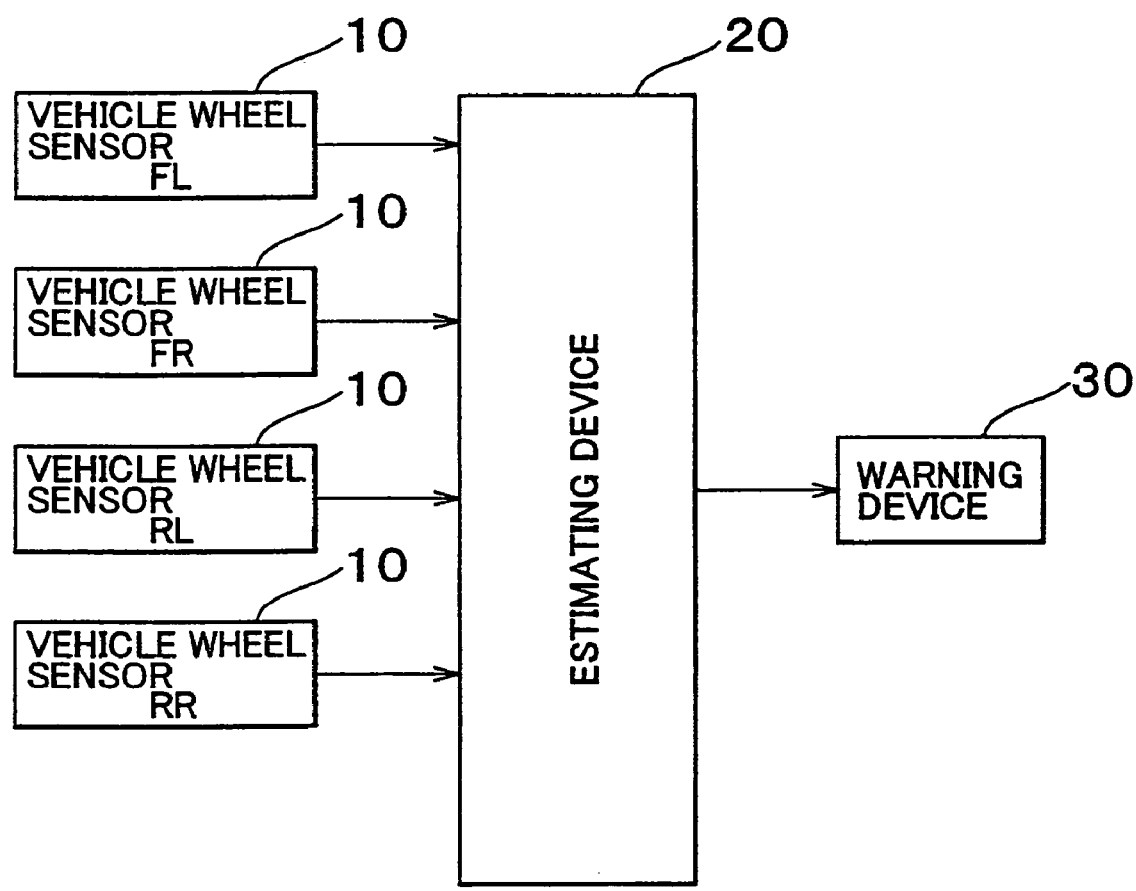
FIG. 1 is a block diagram showing a hardware structure of the tire information obtaining device according to a first embodiment of the present invention.

As shown in FIG. 1, the obtaining device includes a wheel sensor 10 provided in each wheel. In the drawing, "FL" means front left wheel, "FR" means front right wheel, "RL" means rear left wheel, and "RR" means rear right wheel.

The wheel sensor 10, as is well known, detects the angular speed of each wheel and outputs a vehicle wheel speed signal based on the angular speed. In more detail, the wheel speed sensor 10 is of an electromagnetic pick up type and generates a voltage periodically variable according to the timing of passing of the teeth formed on the outer peripheral portion of a rotor rotating with the wheel.

The four sensors 10 are electrically connected to an estimating device 20 as shown in FIG. 1. The estimating device 20 includes a computer and estimates a tire deformation related information as a tire information whether or not a quick deformation is currently being generated in a tire of each wheel.

The estimating device 20 is further connected to a warning device 30. The warning device 30 is actuated to visually or aurally inform a driver of the vehicle that a quick deformation is currently generated at a tire of each wheel. The warning device 30 can be designed to inform the driver that a particular tire is currently quickly deforming.

Figure 2:
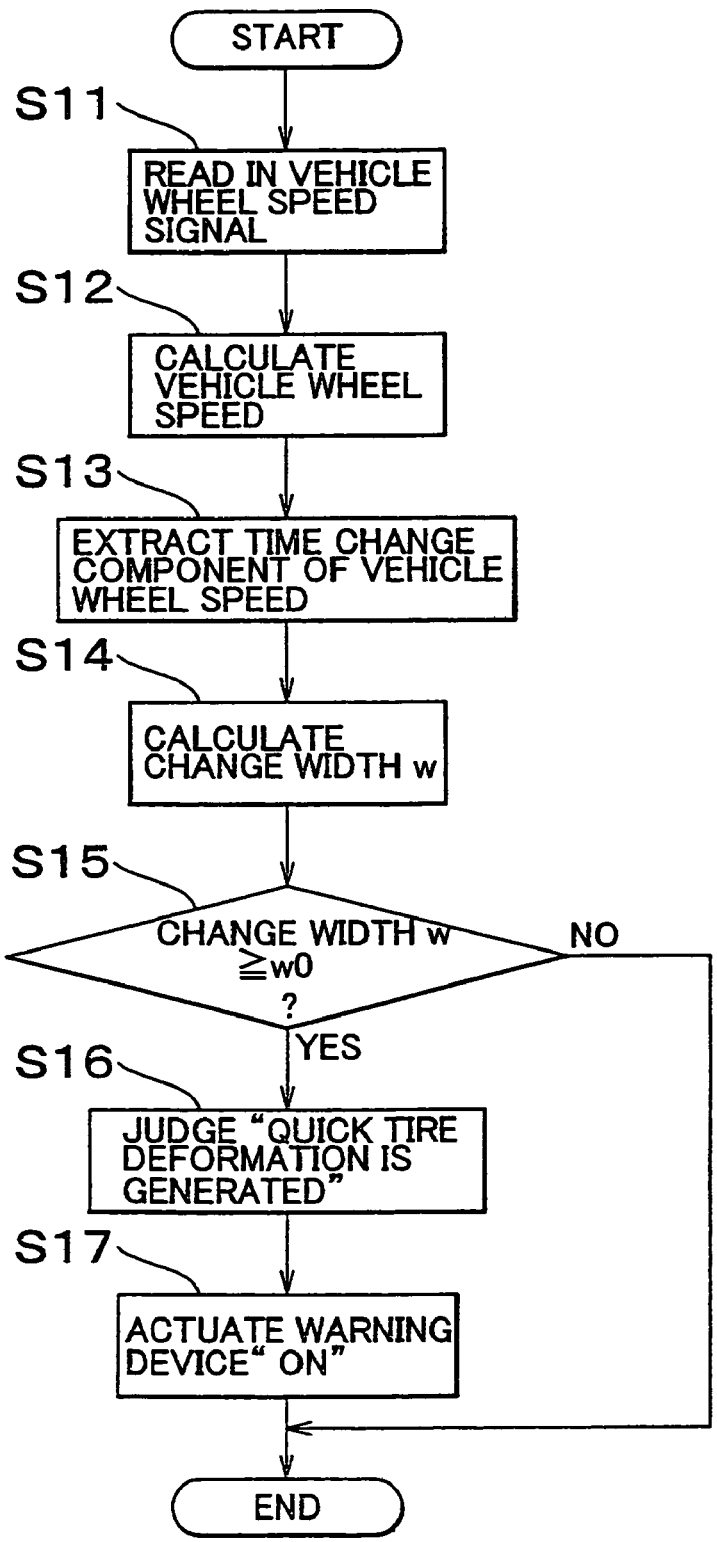
FIG. 2 is a flow chart showing a general tire information obtaining program in FIG. 1 executed by a computer in an estimating device.

FIG. 2 is a flow chart which shows schematically a program for tire information obtaining process executed by a CPU based on a memory stored in ROM of the computer in the estimating device 20.

Upon execution of the program, in each wheel, when at least one condition including a predetermined condition regarding an amplitude of time change component as a change width is established, it is judged that a quick tire deformation is currently generated.

Figure 3:
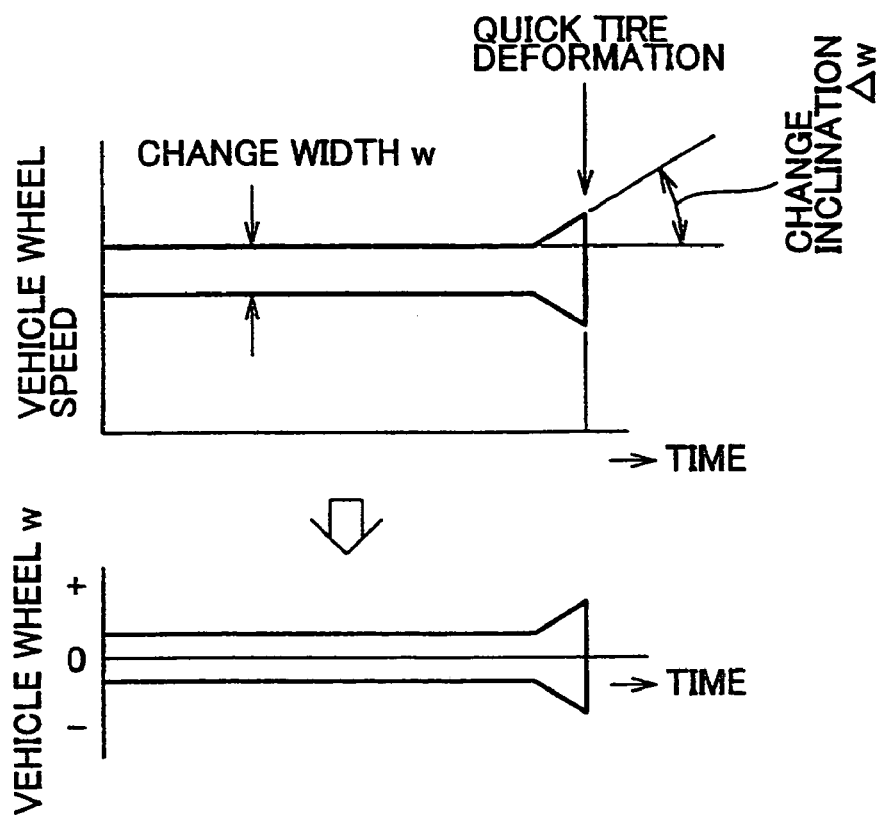
FIG. 3 is a graph explaining the principle for obtaining tire information by the tire information obtaining program shown in FIG. 2.

In FIG. 3, a graph shows a changing condition of wheel speed with time passing upon the transition from a normal condition that the quick tire deformation is not generated to an abnormal condition. Regardless of which condition, the wheel speed is changed with the time passing. The lower graph in FIG. 3 indicates a time change component (short cycle component) of the vehicle wheel speed. Both graphs show the increase of change width in accordance with the condition change from the normal to abnormal. Further, the inclination of time change of the change width increases in accordance with the tire condition change from normal to abnormal.

Figure 4:
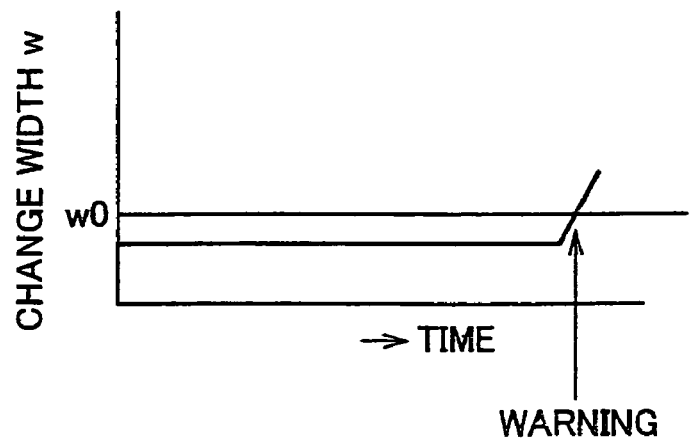
FIG. 4 is another graph explaining the principle for obtaining tire information by the tire information obtaining program shown in FIG. 2.

According to this fact, in a graph shown in FIG. 4, when the change width w of the wheel speed becomes the reference value w₀ or exceeds the value, it is judged that the tire is currently quickly being deformed.

The tire information obtaining program is repeatedly executed at each wheel. Upon execution of the program, in step S11, a vehicle wheel sensor signal corresponding to a wheel which is the subject wheel among the four wheels is outputted from the corresponding wheel sensor to CPU.

In step S12, a wheel speed is calculated based on the wheel speed signal and in step S13, a time change component of the wheel speed is extracted based on the presently calculated wheel speed value and the previously calculated wheel speed value (stored in the RAM). After this, in step S14, the change width w is calculated which is an amplitude of the extracted change component.

For example, as shown in FIG. 3, the change width w is calculated by squaring the data representing the change component which is alternatively changeable between the positive area and negative area.

Instep S15 in FIG. 2, the calculated change width w is judged whether the value is beyond the reference value $w_o$ or under. Supposing the presently calculated change value w is not beyond the reference value $w_o$, the judgment is "NO" and the execution is immediately terminated.

Supposing the presently calculated change value w is beyond the reference value $w_o$, the judgment is "YES" and in the next step S16, it is judged that a quick tire deformation is currently being generated at the subject wheel.

Thereafter, in step S17, the warning device 30 is actuated (ON) to inform the driver of the vehicle that a quick tire deformation is currently generated specifying or not specifying the subject wheel. Thus one execution of the tire information obtaining program is terminated.

In addition, although this embodiment of the invention shows a vehicle with four wheels (for example, passenger car), a large sized vehicle with more than four wheels can be used for obtaining the tire information according to the invention.

Referring to the second embodiment of the present invention, the second embodiment is different from the first embodiment only in a part of the content of the tire information obtaining program and the other elements and components are common to the first embodiment. Accordingly, the tire information obtaining program will be mainly explained hereinafter and the detail of the other portions will be omitted only citing the same reference numerals and part or component names.

In the first embodiment, the quick tire deformation is judged only when the change width w is equal to or more than the reference value $w_o$, but in the second embodiment, when the time change inclination $\Delta w$ of the change width w is equal to or more than the reference value $\Delta w_o$, it is judged that a quick tire deformation is currently generated.

Figure 5:
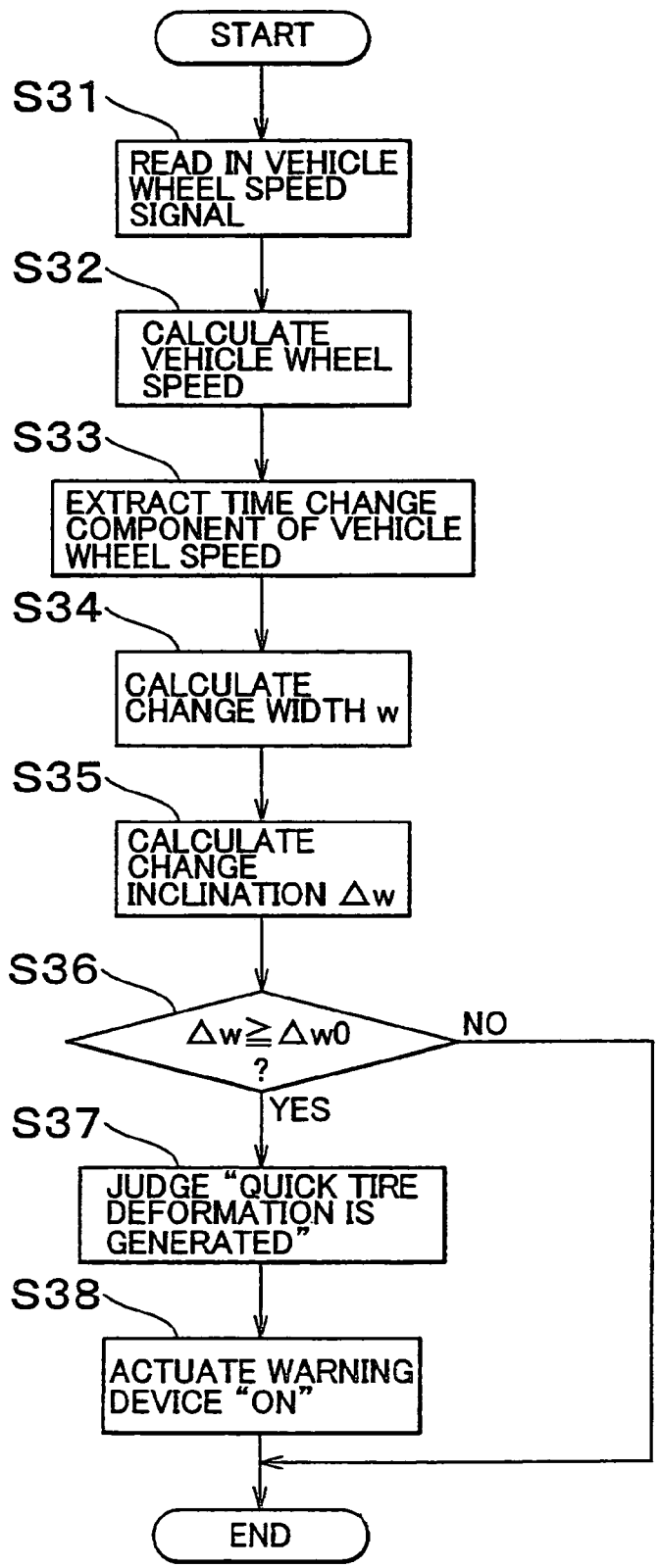
FIG. 5 is a flow chart showing a general tire information obtaining program executed by a computer in an estimating device of a tire information obtaining device according to a second embodiment of the present invention.

In FIG. 5, the flow chart for the tire information obtaining program according to this embodiment is schematically shown. This program is also repeated for every wheel as same as that of the first embodiment. Every time the program is executed, the steps S31 to S34 are similarly proceeded with the steps S11 to S14 in FIG. 2 of the first embodiment.

Figure 6:
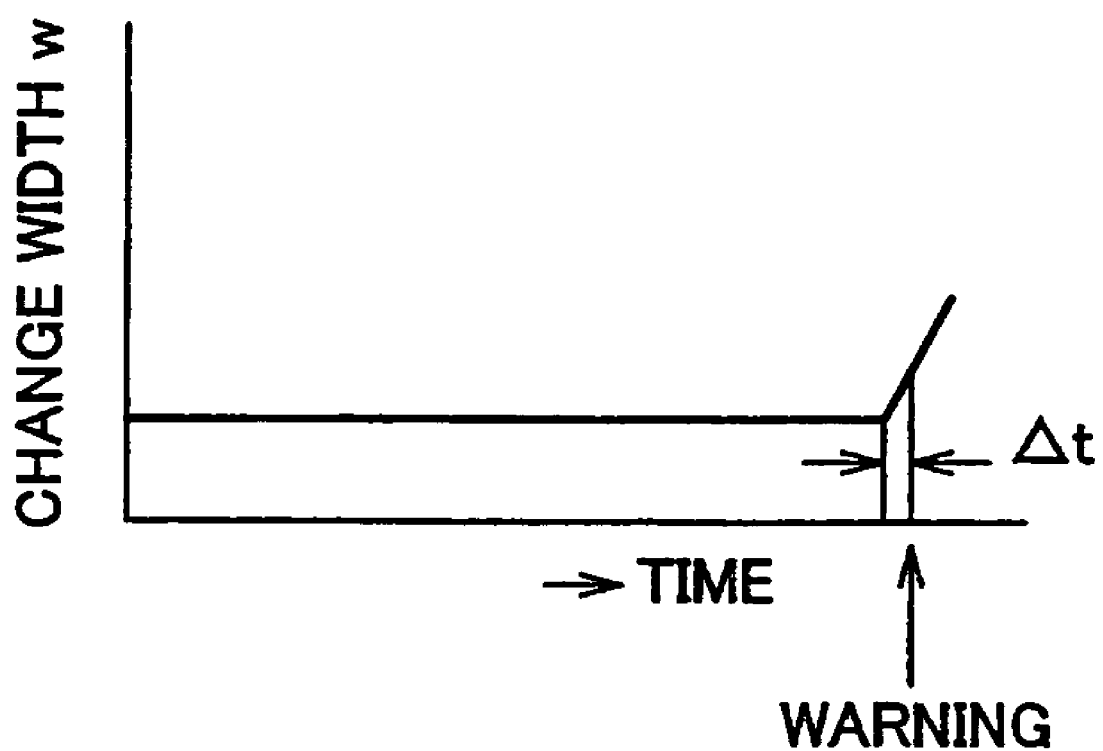
FIG. 6 a graph explaining the principle for obtaining tire information by the tire information obtaining program shown in FIG. 5.

After the step S34, the time change inclination $\Delta w$ of the change width w is calculated in the step S35. In detail, the previously calculated value $w_{n-1}$ is subtracted from the presently calculated change width $w_n$ and then divided by the execution cycle $\Delta t$ to obtain the change inclination $\Delta w$. FIG. 6 shows the relation between the width w and the change inclination $\Delta w$.

In step S36, it is judged whether the calculated change inclination $\Delta w$ exceeds the reference value $\Delta w_o$ or not. Assuming that the presently calculated value $\Delta w$ is not beyond the reference value $\Delta w_o$, the judgment is "NO" and the one cycle of the execution of the program is immediately terminated. Assuming that the presently calculated value $\Delta w$ is equal to or more than the reference value $\Delta w_o$ the judgment is "YES" and in the next step S37, it is judged that the quick tire deformation is currently generated at the subject wheel. Then in step S38, the warning device 30 is actuated "ON" to inform the driver of the vehicle that a quick tire deformation is currently generated specifying or not specifying the subject wheel. The execution of one cycle of the program is terminated.

Next, explaining the third embodiment of the present invention, in this embodiment, only a part of the tire information obtaining program is different from the previous (the second) embodiment and the other parts and components are common. Therefore, only the tire information obtaining program will be explained in detail.

In the second embodiment, it is judged that the quick tire deformation is currently generated when the time change inclination $\Delta w$ is equal to or more than the reference value $\Delta w_o$. However, in this third embodiment, it is judged that the quick tire deformation is currently generated when the change width w is equal to or more than the reference value $w_o$ and when the time change inclination $\Delta w$ is equal to or more than the reference value $\Delta w_o$.

Figure 7:
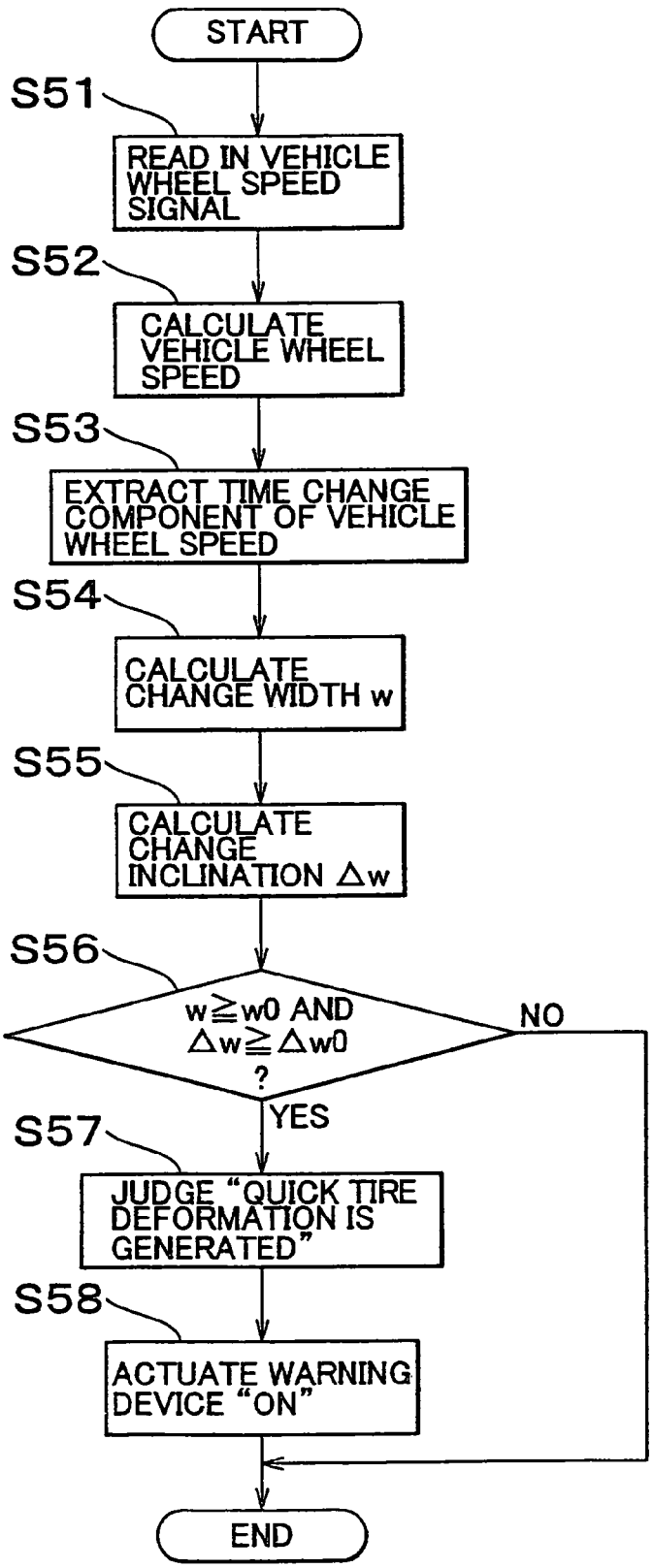
FIG. 7 is a flow chart showing a general tire information obtaining program executed by a computer in an estimating device of a tire information obtaining device according to a third embodiment of the present invention.

In FIG. 7, the flow chart for the tire information obtaining program according to this embodiment is schematically shown. This program is also repeated for every wheel as same as that of the second embodiment. Every time the program is executed, the steps S51 to S54 are similarly proceeded with the steps S31 to S34 in FIG. 5 of the second embodiment.

In step S56, it is judged whether the condition that the change width w calculated in the step S54 is equal to or more than the reference value $w_o$ and the condition that the time change inclination $\Delta w$ calculated in the step S55 is equal to or more than the reference value $\Delta w_o$ are established at the same time or not.

Assuming that these two conditions are not established at the same time, the judgment is "NO" and the execution of this cycle of the program is immediately terminated.

Assuming that these two conditions are established at the same time, the judgment in step S56 is "YES" and in the next step S57, it is judged that the quick tire deformation is currently generated. Thereafter, in step S58, the warning device 30 is actuated "ON" to inform the driver of the vehicle that the quick tire deformation is currently generated specifying or not specifying the subject wheel. Thus the program is terminated for the cycle.

Next, explaining the fourth embodiment of the present invention, in this embodiment, only a part of the tire information obtaining program is different from the previous (the second) embodiment and the other parts and components are common. Therefore, only the tire information obtaining program will be explained in detail.

In the second embodiment, it is judged that the quick tire deformation is currently generated at each wheel regardless of the time change inclination $\Delta w$ of the other wheels. However, in this fourth embodiment, it is judged whether the quick tire deformation is currently generated at one of the front right and front left wheels when the absolute value of right and left wheel change inclination difference D$\Delta w$ which is the difference in change inclination $\Delta w$ between the front right and front left wheels is equal to or more than the positive reference value A. Further, in this fourth embodiment, it is also judged whether the quick tire deformation is currently generated at one of the rear right and rear left wheels when the absolute value of right and left wheel change inclination difference D$\Delta w$ which is the difference in change inclination $\Delta w$ between the rear right and rear left wheels is equal to or more than the positive reference value A.

Figure 8:
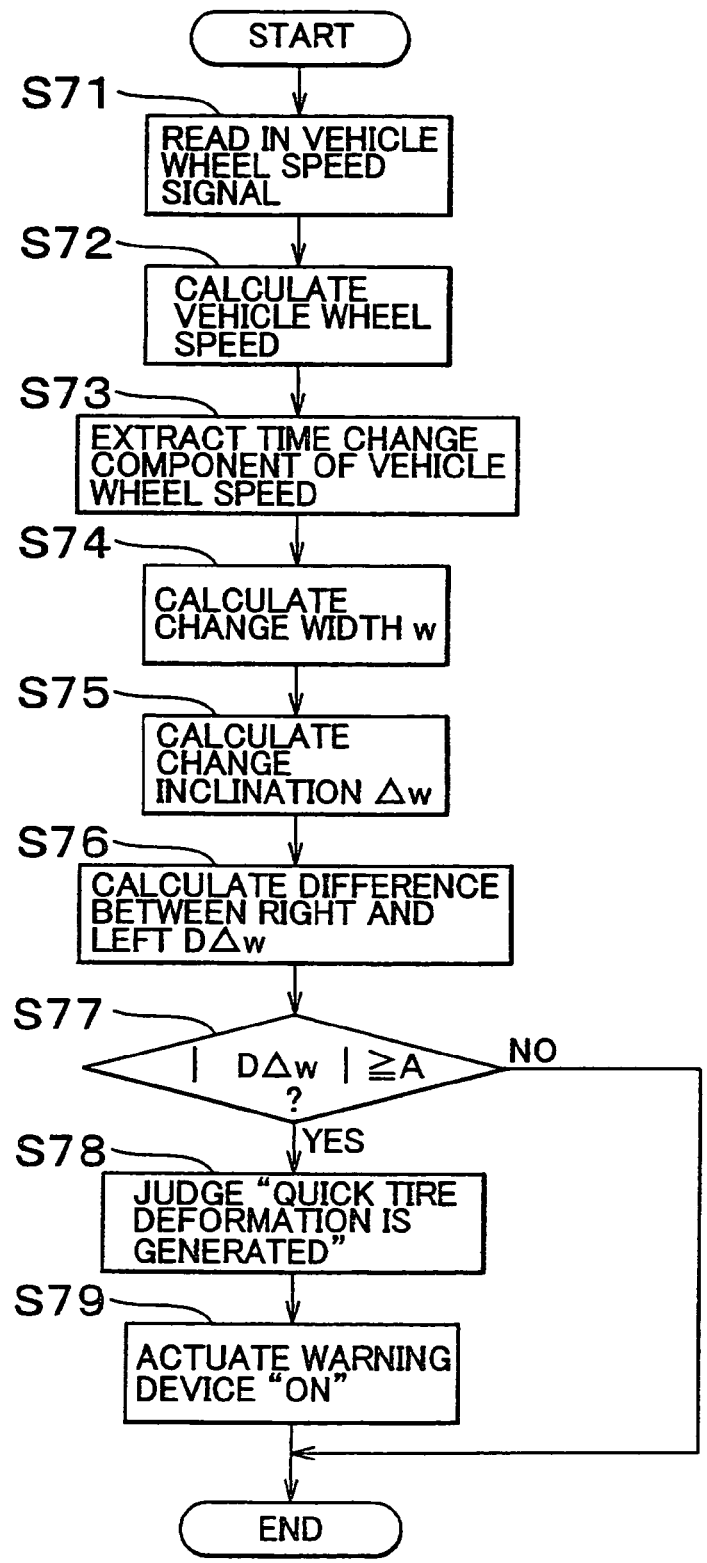
FIG. 8 is a flow chart showing a general tire information obtaining program executed by a computer in an estimating device of a tire information obtaining device according to a fourth embodiment of the present invention.

In FIG. 8, the flow chart for the tire information obtaining program according to this embodiment is schematically shown. This program is also repeated for every wheel as same as that of the second embodiment. Every time the program is executed, the steps S71 to S75 are similarly proceeded with the steps S31 to S35 in FIG. 5 of the second embodiment.

In step S76, the right and left wheel inclination difference DΔw is calculated. When the execution subject wheel is one of the front right and left wheels, the difference DΔw corresponds to the difference between the change inclination Δw at the subject wheel calculated in step S75 and the change inclination Δw previously obtained at the opposite wheel (stored in RAM).

When the execution subject wheel is one of the rear right and left wheels, the difference DΔw corresponds to the difference between the change inclination Δw at the subject wheel calculated in step S75 and the change inclination Δw previously obtained at the opposite wheel (stored in RAM).

In both cases, it is judged whether the absolute value of right and left wheel change inclination difference DΔw calculated in the step S77 exceeds the positive reference value A or not.

Assuming that the absolute value of right and left wheel change inclination difference DΔw is not equal to or more than the positive reference value A, the judgment is "NO" and the program is immediately terminated. On the other hand, assuming that the absolute value of the right and left wheel change inclination difference DΔw is equal to or more than the positive reference value A, the judgment is "YES" and in the next step S78, it is judged that the quick tire deformation is currently generated at either one of the subject wheel and the opposite wheel. Thereafter, in step S79, the warning device 30 is actuated "ON" to inform the driver of the vehicle that the quick tire deformation is currently generated at either one of the subject wheel and the opposite wheel. Thus the program is terminated for the cycle.

It is noted that the program for obtaining the tire information as shown in FIG. 8 is designed to obtain the tire information based on the change inclination Δw, but it is possible to obtain the tire information based on the change width w, by redesigning.

Further, the tire information obtaining program according to FIG. 8 is designed to obtain the tire deformation information based on the difference of the change inclination Δw between the right and rear wheels. However, it may be possible to obtain the tire deformation information based on the ratio of the change inclination Δw between the right and rear wheels or the rate of the change width w between the right and left wheels by redesigning.

Next, explaining the fifth embodiment of the present invention, in this embodiment, only a part of the tire information obtaining program is different from the previous (the fourth) embodiment and the other parts and components are common. Therefore, only the tire information obtaining program will be explained in detail.

In the fourth embodiment, it is judged whether the quick tire deformation is currently generated at one of the right and left wheels when the absolute value of right and left wheel change inclination difference DΔw which is the difference in change inclination Δw between the right and left wheels (front wheels or rear wheels) is equal to or more than the positive reference value A.

On the other hand, according to this fifth embodiment, it is judged that a quick tire deformation is currently generated at any of the four wheels when the absolute value of the relative value RV among the four wheels which is the difference between the difference of change inclination Δw between the front left wheel and the rear right wheel and the difference of change inclination Δw between the front right wheel and the rear left wheel exceeds a reference value B.

The relative value RV among the four wheels is defined by the following formula (1):

$$RV=(\Delta wFL-\Delta wRR)-(\Delta wFR-\Delta wRL) \tag{1}$$

Wherein:

ΔwFL: change inclination Δw relating front left wheel

ΔwRR: change inclination Δw relating rear right wheel

ΔwFR: change inclination Δw relating front right wheel

ΔwRL: change inclination Δw relating rear left wheel

Figure 9:
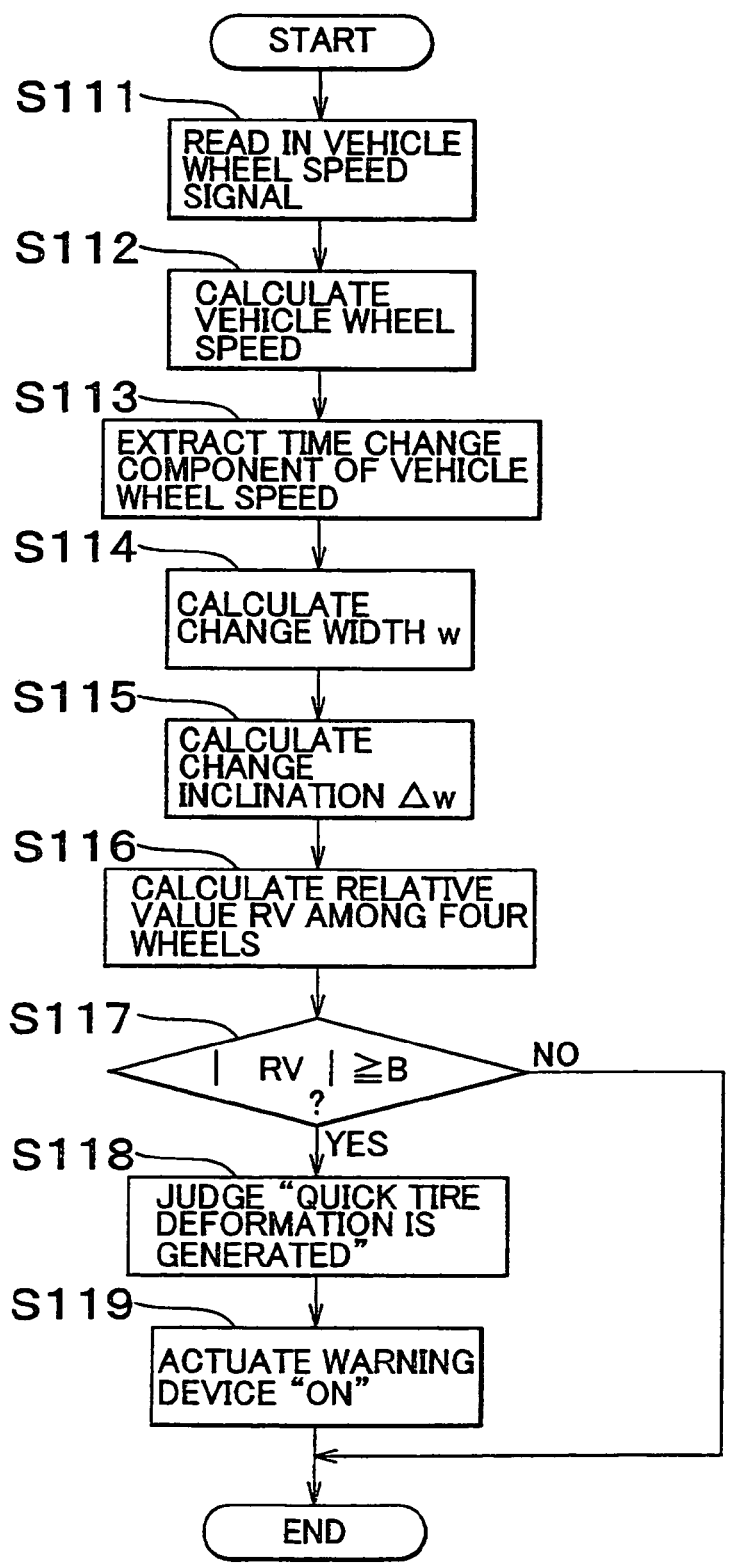
FIG. 9 is a flow chart showing a general tire information obtaining program executed by a computer in an estimating device of a tire information obtaining device according to a fifth embodiment of the present invention.

In FIG. 9, the flow chart for the tire information obtaining program according to this embodiment is schematically shown. This program is also repeated for every wheel as same as that of the fourth embodiment. Every time the program is executed, the steps S111 to S115 are similarly proceeded with the steps S71 to S75 in FIG. 8.

After in step S116, the relative value RV among the four wheels is calculated. In detail, the presently calculated change inclination Δw in step S116 relating the subject wheel and the other change inclinations Δw previously obtained (stored in RAM) relating the other three wheels are substituted for the above formula to obtain the relative value RV among the four wheels.

In step S117, it is judged whether the absolute value of the calculated relative value RV is beyond the reference value B or not. Assuming that the calculated relative value RV is not equal to or more than the reference value B, the judgment is "NO" and the program is immediately terminated.

On the other hand, assuming that the absolute value of the calculated relative value RV is equal to or more than the reference value B, the judgment in step S117 is "YES" and it is judged that a quick tire deformation is currently being generated at any one of the wheels in step S118. Thereafter, in the next step S119, the warning device 30 is actuated "ON" to inform the driver of the vehicle that a quick tire deformation is currently generated at any of the four wheels. The cycle of the program is then terminated.

It is noted that the program for obtaining the tire information as shown in FIG. 9 is designed to obtain the tire information based on the change inclination Δw, but it is possible to obtain the tire information based on the change width w, by redesigning.

Further, the tire information obtaining program according to FIG. 9 is designed to obtain the tire deformation information based on the difference of the change inclination Δw between the relative wheels. However, it may be possible to obtain the tire deformation information based on the ratio of the change inclination Δw between the relative wheels or the rate of the change width w between the relative wheels by redesigning.

Next, the sixth embodiment of the invention will be explained.

In this embodiment, only a part of the tire information obtaining program is different from the previous (the second) embodiment and the other parts and components are common. Therefore, only the tire information obtaining program will be explained in detail.

In the second embodiment, the warning device 30 is actuated to inform that the quick tire deformation is currently generated only when it is judged that the quick tire deformation is currently generated at a wheel. On the other hand, according to this sixth embodiment, tire pressure P is estimated for each wheel using the wheel speed sensor 10 and when the estimated tire pressure P is equal to or less than a reference value $P_0$ the warning device 30 is actuated to inform the driver of the vehicle that the tire pressure is abnormally low.

Further, in this embodiment, the quick tire deformation is judged only when the estimated tire pressure P is equal to or less than the reference value $P_0$ and according to the judgment, the warning device 30 is actuated to inform the driver of the vehicle that the quick tire deformation is currently generated.

The warning device 30 of this embodiment is designed to be able to inform the driver of the vehicle that the tire pressure is abnormally low and the quick tire deformation is currently generated and such information can be identified by the driver.

In FIG. 10, the flowchart for the tire information obtaining program according to this embodiment is schematically shown. This program is also repeated for every wheel as same as that of the second embodiment.

In step S131, the wheel speed signal corresponding to the subject wheel received from the wheel sensor is stored. In step S132, the wheel speed is calculated based on the stored wheel speed signal. In step S133, the tire pressure P of the subject wheel is calculated based on the calculated wheel speed and, if necessary, based on the previously calculated value (stored in RAM).

Considering that the resonance frequency of time series data representing the wheel speed is varied in accordance with the tire pressure P, the tire pressure P can be estimated based on the resonance frequency. The tire pressure P is, as disclosed in the Japanese Patent Application Publication 2000-238516, it is possible to estimate the tire pressure P based on the disturbance observer.

According to the disturbance observer, a tire model which includes a relatively rotatable rim side portion and a belt side portion being mutually connected to each other by a torsion spring is hypothetically formed and based on the tire model, a dynamic system is hypothetically formed which describes the rotational movement of each wheel. The dynamic system regards the change of spring constant of the torsion spring according to the change of tire pressure of each wheel as a disturbance for each wheel. The disturbance is estimated as one of the state variables of the dynamic system by using the wheel speed signal outputted from each wheel sensor 10 as a signal representing the wheel speed at the rim side portion of each wheel.

Thus the disturbance observer estimates the tire pressure for each wheel based on the estimated disturbance.

After the tire pressure P is estimated, in step S134, it is judged whether the estimated tire pressure P is below the reference value $P_0$. Assuming that the estimated tire pressure P is not equal to or less than the reference value $P_0$ the judgment is "NO" and the current cycle tire information obtaining program is immediately terminated. Assuming that the estimated tire pressure P is equal to or more than the reference value $P_0$ the judgment is "YES" and the warning device 30 is actuated in step S135 to inform the driver of the vehicle that the tire pressure is abnormally low.

After this step, the execution is continued according to the steps S136 through S139 as similar to the execution made under the steps S33 through S36 explained in the second embodiment. Assuming that the change inclination $\Delta w$ is equal to or less than the reference value $\Delta w_0$ in step S138, the judgment in the step S139 is "YES" and the warning device 30 is actuated in step S140 to inform the driver of the vehicle that the quick tire deformation is currently generated. One cycle of the program is then terminated.

It is noted that the program for obtaining the tire information as shown in FIG. 10 is designed to obtain the tire information based on the change inclination $\Delta w$, but it is possible to obtain the tire information based on the change width w, by redesigning.

Having explained various embodiments of the invention with reference to the attached drawings, it should be noted that these are shown as some of the examples of the invention and that it is possible to execute the invention based the various variations and improvements according to the knowledge of the people in the art as well as based on the embodiments described in the "means to solve the problems and the effects of the invention".

What is claimed is:

1. A device provided in a vehicle having a vehicle wheel (FL, FR, RL, RR) including a tire installed in a wheel and filled with the air under pressure for estimating and obtaining a tire information of the tire, comprising:

a vehicle wheel speed sensor for detecting a vehicle wheel speed which is an angular speed of the vehicle wheel and outputting a vehicle wheel speed signal in response to the vehicle wheel speed; and an estimating device for estimating a tire deformation related information, wherein the estimating device judges that a quick deformation is currently generated or a possibility of the generation of the quick deformation in future at the tire exists if a predetermined condition regarding a time change component of the vehicle wheel speed signal is established, wherein as the time change component at least one of time change width (w) and inclination thereof ($\Delta w$) is established.

2. The device according to claim 1, wherein the change width (w) is an amplitude of the time change component.

3. The device according to claim 1, wherein the estimating device judges that the quick deformation is currently generated or the possibility of the generation of the quick deformation in future at the tire exists when at least a condition that the change width is equal to or more than a predetermined value (w0) is established.

4. The device according to claim 1, wherein the estimating device judges that the quick deformation is currently generated or the possibility of the generation of the quick deformation in future at the tire exists when at least a condition that the time change inclination of the change width which is the amplitude of the time change component of the vehicle wheel speed is equal to or more than a predetermined value ($\Delta w0$) is established.

5. The device according to claim 1, wherein the estimating device includes:

(a) an estimating means for estimating the air pressure of the tire based on the outputted vehicle wheel speed signal, and (b) a judging means for judging that the quick deformation is currently generated or the possibility of the generation of the quick deformation in future at the tire exists when a condition that the estimated air pressure of the tire is lower than a normal value and a predetermined condition relating the change component are both established.

6. The device according to claim 5, wherein the estimating means includes a disturbance observer having a tire model hypothetically formed which includes a relatively rotatable rim side portion and a belt side portion being mutually connected to each other at least by a torsion spring and a dynamic system hypothetically formed which describes a rotational movement of each wheel based on the tire model, and that the dynamic system regards a change of spring constant with the torsion spring according to the change of the tire pressure of each wheel as a disturbance for each wheel for estimating as one of the state variables of the dynamic system by using the vehicle wheel speed signal outputted from the vehicle wheel sensor as a signal representing the vehicle wheel speed at the rim side portion of each wheel, wherein the disturbance observer estimates the tire pressure for each wheel based on the estimated disturbance.

7. The device according to claim 1, wherein the device further includes an information device informing a driver of the vehicle that the quick deformation is currently generated or the possibility of the generation of the quick deformation at the tire exists in future when judged by the estimating device.

8. The device according to claim 1, wherein the vehicle includes a plurality of wheels and that the vehicle wheel speed sensors are provided in each wheel, wherein the estimating device judges whether the quick deformation is currently generated or the possibility of the generation of the quick deformation in future at each tire exists based on the change component independently of the other wheels.

9. The device according to claim 1, wherein the vehicle includes front right and left wheels and rear right and left wheels and that the vehicle wheel speed sensors are respectively provided in the plurality of wheels, wherein the estimating device judges whether the quick deformation is currently generated or the possibility of the generation of the quick deformation in future exists at any of the tire of the plurality of wheels based on difference of characteristic or the ratio of the change components among the plurality of wheels.

10. The device according to claim 9, wherein the estimating device judges whether the quick deformation is currently generated or the possibility of the generation of the quick deformation in future exists at any of the tire of the front right and left wheels or any of the rear right and left wheels based on difference of characteristic or the ration of the change components between the front right and left wheels and rear right and left wheels.

11. The device according to claim 9, wherein estimating device judges whether the quick deformation is currently generated or the possibility of the generation of the quick deformation in future exists at any of the tire of the plurality of wheels based on difference of characteristic or the ration of the change components between the front right left wheels and difference of characteristic or the ratio of the change components between the rear right left wheels.

12. The device according to claim 9, wherein the estimating device judges whether the quick deformation is currently generated or the possibility of the generation of the quick deformation in future exists at any of the tire of the plurality of wheels based on difference of characteristic or the ratio of the change components between the front left wheel and rear right wheel and difference of characteristic or the ratio of the change components between the front right wheel and rear left wheel.

13. A method for estimating and obtaining a tire information of a vehicle having a vehicle wheel including a tire filled with an air under pressure and installed in a wheel, comprising:
   detecting a vehicle wheel speed as an angular speed of the vehicle wheel;
   estimating a tire deformation related information; and
   judging that a quick deformation is currently generated or a possibility of the generation of the quick deformation in future at the tire exists if a predetermined condition regarding a time change component of the vehicle wheel speed is established, wherein as the time change component at least one of time change width (w) and inclination thereof ($\Delta$w) is established.

14. A tire information obtaining program for executing the tire information obtaining method according to claim 13 by a computer.

* * * * *